United States Patent [19]

Champavier

[11] Patent Number: 4,746,846
[45] Date of Patent: May 24, 1988

[54] DIRECT CURRENT MOTOR CONTROL, AND USES TO MEASURE FORCE, AND WITH A PHYSICAL EXERCISE DEVICE

[76] Inventor: Louis Champavier, Les Gipières, 06370 Mouans Sartoux, France

[21] Appl. No.: 852,535

[22] Filed: Apr. 16, 1986

[30] Foreign Application Priority Data

Apr. 16, 1985 [FR] France ............................. 85 05691

[51] Int. Cl.$^4$ .................................................. G05B 5/00
[52] U.S. Cl. .................................... 318/619; 318/317; 318/326; 318/329; 318/341
[58] Field of Search ................ 318/300, 314, 316, 317, 318/318, 322, 326, 327, 328, 329, 331, 332, 338, 339, 341, 345 T, 430, 432, 433, 434, 438, 599–608, 611, 615, 618, 628, 619

[56] References Cited

U.S. PATENT DOCUMENTS

| | | | |
|---|---|---|---|
| 3,617,844 | 11/1971 | Grygera | 318/331 |
| 3,629,633 | 12/1971 | O'Callaghan | 318/317 |
| 3,694,720 | 9/1972 | Nakajima | 318/327 X |
| 4,019,107 | 4/1977 | Dixon et al. | 318/338 |
| 4,119,897 | 10/1978 | Skoog | 318/327 X |
| 4,182,979 | 1/1980 | Douglas et al. | 318/332 X |
| 4,268,781 | 5/1981 | Kawada et al. | 318/332 X |
| 4,300,079 | 11/1981 | Kawada et al. | 318/338 X |
| 4,476,417 | 10/1984 | Zimmermann | 318/326 X |
| 4,484,117 | 11/1984 | Bose | 318/338 |
| 4,528,487 | 7/1985 | Jimbo et al. | 318/338 |
| 4,549,122 | 10/1985 | Berkopec et al. | 318/338 |
| 4,556,830 | 12/1985 | Schwalm et al. | 318/331 X |
| 4,574,226 | 3/1986 | Binder | 318/332 X |
| 4,578,626 | 3/1986 | Richter | 318/338 |
| 4,622,779 | 11/1986 | Schadlich | 318/332 X |

Primary Examiner—William M. Shoop, Jr.
Assistant Examiner—Paul Ip
Attorney, Agent, or Firm—Schweitzer & Cornman

[57] ABSTRACT

A control device for a direct current electric motor (1) including:
  an external control loop, namely, a "speed loop", by means of which the speed of rotation (N) of the motor is fed back to the input of the device, as a voltage at the terminals of a tachometer generator (2) coupled to the motor, and compared to a reference signal, the error signal ($e_1$) thus generated being amplified in a "speed amplifier" (8) to provide a "current reference signal";
  an internal control loop, namely, "a current sensing loop", by means of which the intensity (I) in the motor is fed back to the output of the speed amplifier, and compared to the current reference signal, the error signal ($e_2$) thus obtained being amplified in "a current error signal amplifier" (13) to furnish an input signal ($U_{all}$) to a control circuit (4), and
  a current limiter (9) placed between the output of the speed amplifier and the input of the current sensing loop.

The current limiter includes means to provide a signal corresponding to the current required to compensate for the losses of the motor, means to provide a signal corresponding to the useful current to obtain the desired operation, and an adder circuit to add up the signals.

11 Claims, 3 Drawing Sheets

DIRECT CURRENT MOTOR CONTROL, AND USES TO MEASURE FORCE, AND WITH A PHYSICAL EXERCISE DEVICE

The present invention relates to a control device for a direct current electric motor and, more particularly, to such a device of the type having:

an external control loop namely, a "speed loop", by means of which the speed of rotation of the motor is fed back to the input of the device, especially in the form of a voltage from terminals of a tachometer generator coupled to the motor, and compared to a reference signal, the error signal thus generated being amplified in a "speed amplifier" to provide a "current reference signal", and an internal control loop namely, an "current sensing loop", by means of which a signal corresponding to the current level in the motor is fed back to the output of the speed amplifier, and compared to the reference current signal, the error signal thus obtained being amplified in "a current error signal amplifier" to provide the input control signal to a control circuit.

Such devices are already known in which, in particular, a current limiter is placed between the output of the speed amplifier and the input of the current sensing loop.

This current limiter is generally formed by means of two potentiometers which control, according to the sense of operation, the limit of the current in the supply circuit of the motor.

However, this arrangement has the disadvantage of lumping together all the operating parameters of the motor. Actually, only one portion of the current in the motor is used to drive the useful load under the desired conditions. The other portion of the current is used only to compensate for losses.

The result is that, in motors having significant losses, a current limiter is provided to allow the passage of a relatively high current. Then, to prevent the appearance of too-high currents in the motor, a time constant is placed on the current sensing loop, which feeds back to reduce the speed of response of the control, and, consequently, the speed of response of the motor performances.

The first aim of the invention is to provide a control device which eliminates this disadvantage and consequently increases the speed of response of the motor.

To this end, the invention has as its object a control device for a direct current electric motor having:

an external control loop namely, a "speed loop", by means of which the speed of rotation of the motor is fed back to the input of the device, especially in the form of the voltage from terminals of a tachometer generator coupled to the motor, and compared to a reference signal, the error signal thus generated being amplified in a "speed amplifier" to provide an "current reference signal", an internal control loop namely, a current sensing loop", by means of which the current in the motor is fed back to the output of the speed amplifier and compared to the current reference signal, the error signal thus obtained being amplified in an "current error signal amplifier" to form the input signal to a control circuit, and a current limiter placed between the output of the speed amplifier and the input of the current sensing loop, characterized by the fact that the current limiter includes means to provide a signal corresponding to the signal required to compensate for losses to the motor, means to provide a signal corresponding to the useful current to obtain the desired operation, and an adding circuit to add up the signals.

Consequently it will be understood that the device according to the invention allows the useful current and the loss currents to be treated separately.

Preferably, the means to provide the signal corresponding to the loss currents include means to provide separately a signal corresponding to the break-away torque, and a signal corresponding to the speed losses during operating.

Actually it is known that friction causes two different types of losses. Static losses correspond to the force which must be supplied to put the motor in motion from a stop, that is to say, at the break-away torque. The dynamic losses correspond to the friction as a function of the speed, and are generally proportional to the latter.

The current limiter preferably also has means to provide a signal corresponding to the current required by the motor to overcome the forces of inertia and to attain the desired speed of rotation, and to add this signal to the signals corresponding to the loss currents and to the useful current.

This latter signal consequently corresponds to the current needed to accelerate the motor to the desired speed. It is null in the case of operation at constant speed.

In one particular embodiment, the inputs of the adder circuit consist of the center taps of potentiometers connected between ground and, respectively, a fixed voltage, a voltage representing the speed of rotation of the motor, a voltage representing the acceleration of the motor, and a voltage representing the desired operation.

The fixed voltage corresponds to the static friction, the voltage representing the speed of rotation corresponds to the dynamic friction, and the voltage representing the acceleration corresponds to the forces of inertia. Later it will be seen that the control of the regulation is accomplished very simply by means of these potentiometers.

The means to provide the signal corresponding to the useful current to obtain the desired operation can include means chosen from the group of:

means to provide a signal corresponding to the difference between the speed of rotation of the motor and a reference speed, means to provide a signal corresponding to a reference torque, means to provide a signal representing a given function of time.

The preparation of the signal corresponding to the difference between the speed of rotation of the motor and a reference speed enables operation of the motor at constant speed.

If, to the contrary, a signal is provided which corresponds to a reference torque, the motor then operates at constant torque.

Finally, by providing a signal representing a given function of time, the motor can be caused to follow a desired operating cycle.

In particular, the means to provide the signal corresponding to the useful current can include at least two means from the group and means to add the corresponding signals.

Then it is possible, for example, to add oscillations or vibrations around the operating point at constant speed or at constant torque.

Display means can also be connected to the means to provide the signal corresponding to the useful current.

This display is actually particularly significant since, contrary to what happens in the prior art, this useful current corresponds actually, and uniquely, to what is demanded from the motor, independent of all losses.

Another disadvantage of the prior control devices of the type mentioned above resides in the non-linearity of the torque as a function of the input signal in the control circuit, for different levels of speed.

More particularly, in the case of a motor supplied from thyristor bridges controlled by a firing circuit which determines their firing angle, the motor torque is a function of both this firing angle and of the speed of rotation.

Actually it can be shown that the firing angle a can be written in the form:

$$a = f(E) + g(I)$$

where E is the center-electromotive force developed by the motor, and I is the current in the motor. The non-linearity can then be demonstrated by writing the classical equations of the direct current motor:

$$E = k_1 NO$$

$$C = k_2 OI$$

where $k_1$ and $k_2$ are constants, N is the speed of rotation of the motor, O is the field, and C is the torque on the motor shaft.

By using the values thus obtained for E and I in equation 1, the result is:

$$a = f'(N) + g'(C)$$

which shows that the torque depends on both the firing angle, that is, the control signal, and on the speed of rotation.

Another aim of the invention is to make the motor torque independent of the speed of rotation for a given value of the control signal.

To this end, the invention also has as its object a control device for a direct current electric motor having:

an exteral control loop namely, a "speed loop" by means of which the speed of rotation of the motor is fed back to the input of the device, especially in the form of the voltage from the terminals of a tachometric generator couple to the motor, and compared to a reference signal, the error signal thus generated being amplified in a "speed amplifier" to provide a "current reference signal"; and an internal control loop namely, an "current sensing loop" by means of which a signal corresponding to current in the motor is fed back to the output of the speed amplifier and compared to the current reference signal, the error signal thus obtained being amplified in an "current error signal amplifier" to provide the input signal to a control circuit, characterized by the fact that it includes means for adding to the error signal of the current sensing loop, a signal the absolute value of which is a function of the speed of rotation of the motor and of which the sign depends on whether the motor is operating as a motor per se, or as a generator.

The absolute value of the signal can in particular be proportional to the speed.

Consequently there is a polarization of the control as a function of the speed of rotation of the motor, which has the particular advantage of being able to pass directly from one operating quadrant to another without the "dead zones" which are usual in regulators without circulating current, or feed back control.

In the case in which the control device according to the invention is used to control a motor supplied by two rectifier bridges, and consequently includes a logic control unit to select one of the bridges according to whether the motor is operating as a motor per se, or as a generator, the sign of the signal as a function of the speed of rotation can be determined by this logic control unit.

More particularly, the device can include a switch controlled by this logic, the switch being provided to apply the absolute value of the signal as a function of the speed, either to the positive input or to the negative input of the current error signal amplifier.

The invention also has as its object a force measuring and/or a physical exercise apparatus, characterized by the fact that they include a direct current electric motor and a control device like those described above.

It has already been seen that it was possible to display with precision the effective current corresponding to the useful torque on the motor shaft. The motor and the control device according to the invention thus allow the force exerted on the shaft to be effectively measured in real time.

It is particularly interesting to use this characteristic in physical exercise apparatus which are thus able to operate either at constant speed or at constant force, possibly with the addition of stimuli such as oscillations to one of these two modes of operation.

One particular embodiment of the invention will now be described by way of non-limiting example with reference to the attached drawings.

DETAILED DESCRIPTION

Figure 1:
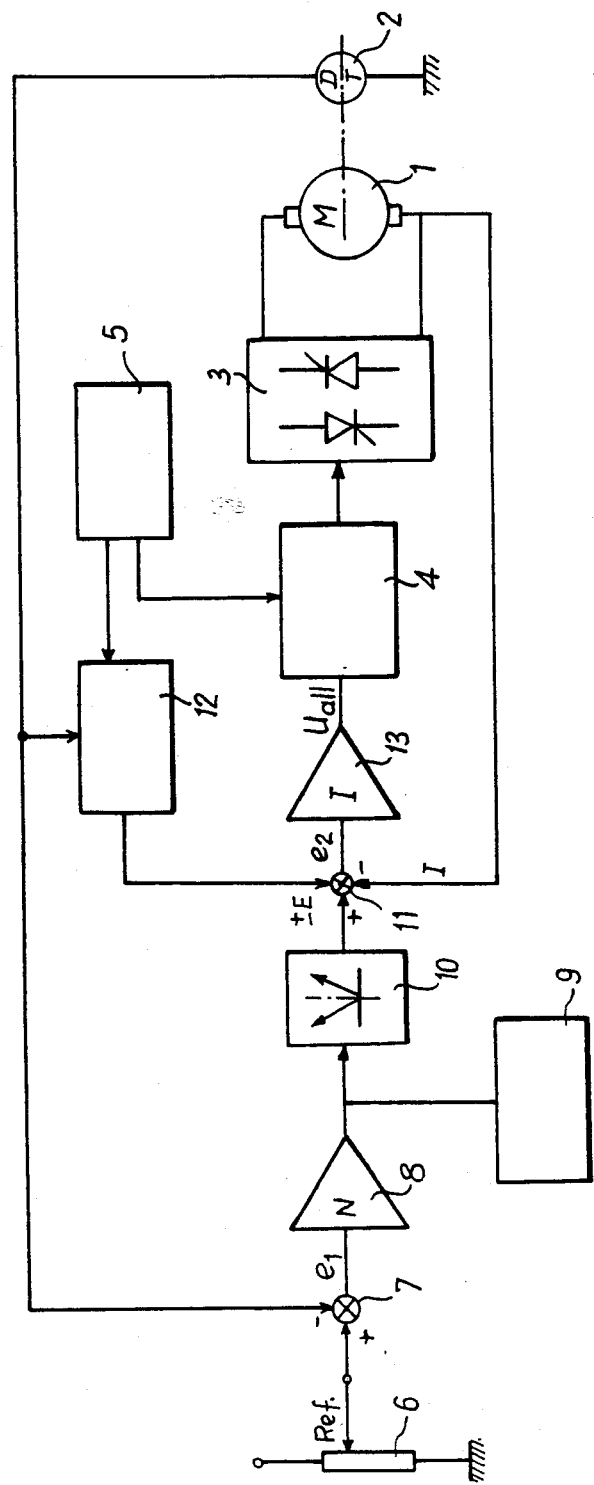
FIG. 1 is an overall schematic of a control device according to the invention.

FIG. 1 shows a direct current motor 1 supplied by a monophase power supply to which is mechanically coupled a tachometer generator 2.

Motor 1 is supplied with power by one of two thyristor bridges 3, depending on whether it is operating as a motor per se, or as a generator. In the first case, the motor opposes with a counterelectromotive force to the supply voltage and, in the second case, it sends back current to the supply.

Thyristor bridges 3 are controlled by a firing circuit 4 which determines the firing angle of the thyristors, starting from a reference voltage $U_{all}$ and the information furnished by a logic control unit 5 which particularly takes into account safety information, the sign of the current reference signal described below, and the presence or absence of current. Logic unit 5 particularly determines which of the two thyristor bridges 3 is used as a function of the quadrant (motor or generator) of operation of the motor.

The method by which reference voltage $U_{all}$ is obtained will now be described.

A potentiometer 6 supplies a reference voltage to the positive input of an adder 7 which receives on its negative input the feed back speed signal constituted by the voltage at the terminals of tachometer generator 2, and proportional to the speed of rotation N of the motor.

The difference thus obtained, or error speed $e_1$, is amplified in an amplifier 8 and limited in a current limiter 9, according to the invention, which will be described in detail later.

A circuit 10 allows the formation of the absolute value of the signal thus obtained, which absolute value constitutes the current reference signal for the internal control loop or current sensing loop.

This current reference signal is applied to the positive input of an adder 11 which also receives on its negative input the feed back current signal proportional to current I passing through motor 1.

According to the invention, there is also applied to one input of adder 11, a linearization signal proportional to the speed of rotation of the motor, that is, as was shown above, proportional to the counterelectromotive force developed by the motor. This signal is transformed by a linearization circuit 12 according to the invention starting, on the one hand, from the voltage at the terminals of tachometer generator 2, and, on the other hand, from the state of the logic control unit 5, as a function of the quadrant in which the motor operates.

Signal $e_2$, equal to the current reference signal less the feed back current signal plus or minus the linearization signal, is amplified in amplifier 13 whose output $U_{all}$ constitutes the firing control signal.

Figure 2:
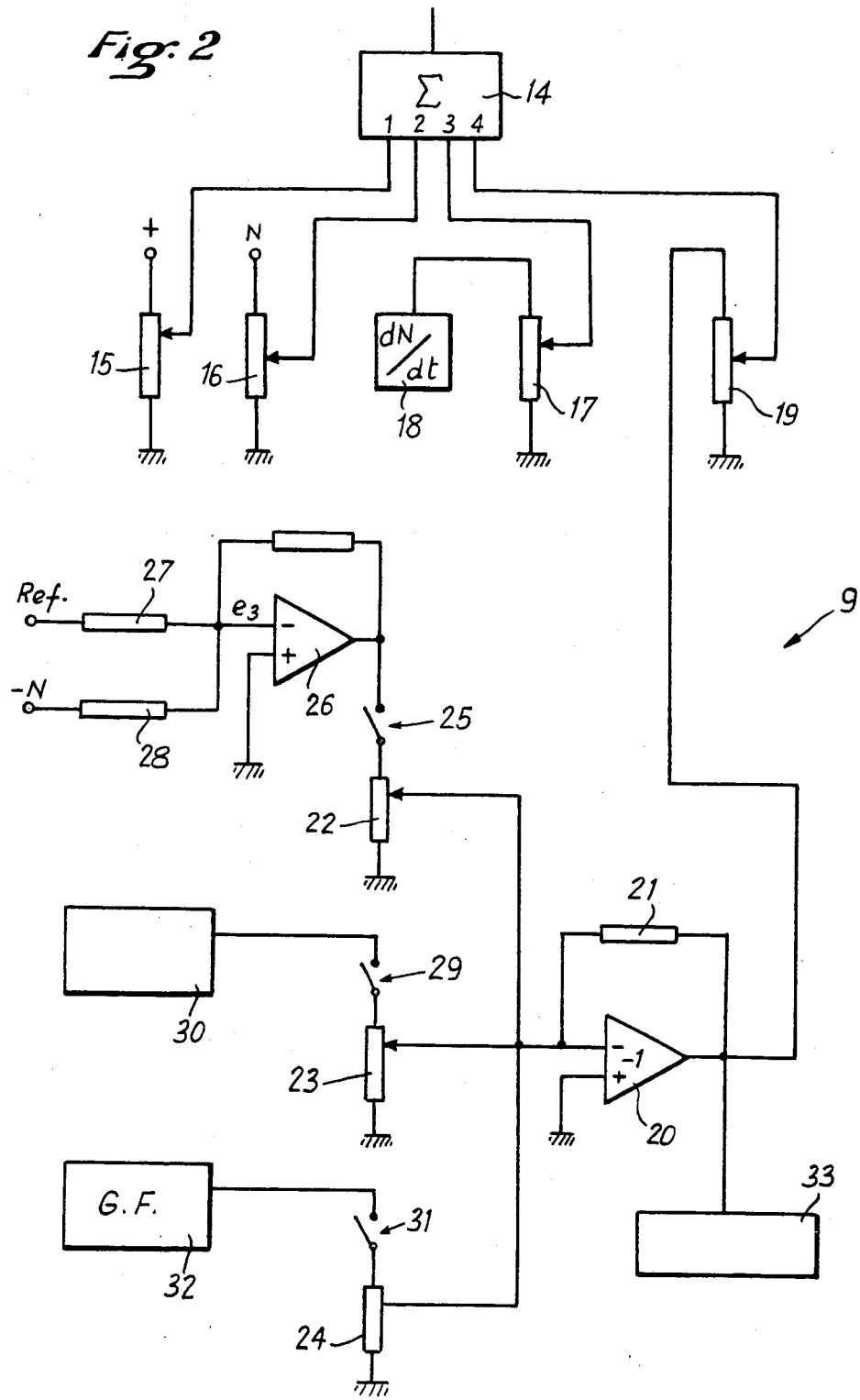
FIG. 2 shows the current limiter of FIG. 1 in greater detail.

Current limiter 9 shown in detail on FIG. 2 includes an adder 14 with four inputs and the output of which is connected to the output of amplifier 8.

The first input of adder 14 is connected to the center tap of a potentiometer 15 connectedl between ground and a fixed voltage.

The second input of adder 14 is connected to the center tap of a potentiometer 16 connected between ground and a voltage N proportional to the speed of rotation of the motor. This voltage can be obtained at the terminals of tachometer generator 2.

The third input of adder 14 is connected to the center tap of a potentiometer 17 connected between ground and a voltage proportional to the acceleration of the motor. This voltage can be obtained by means of a deriving circuit 18 from the voltage at the terminals of the tachometer generator 2.

The fourth input of adder 14 is connected to the center tap of a potentiometer 19 connected between ground and the output of an adding amplifier 20.

A resistor 21, connected in a known fashion between the output of amplifier 20 and its negative input, ensures a unity gain for the amplifier. The negative input of amplifier 20 is also connected to the center taps of three control potentiometers 22, 23 and 24 one end of each of which is connected to ground.

The other end of potentiometer 22 is connected, by a switch 25, to the output of an adding amplifier 26, which receives on its negative input, on the one hand a reference voltage, by means of a resistor 27, and on the other hand a voltage −N, proportional to the negative of the speed of rotation N of the motor, by means of a resistor 28.

The output of amplifier 26 is thus a measure of the amplified difference $e_3$ between the actual speed of rotation of the motor and a reference value.

The other end of potentiometer 23 is connected, by a means switch 29, to a display unit 30 for displaying and setting the value of the useful torque furnished by the motor.

Finally, the other end of potentiometer 24 is connected, by a switch 31, to function generator 32.

The output of amplifier 20 is also connected to another display unit 32.

The adjustment of potentiometers 15, 16 and 17 is achieved as follows.

The motor being stopped, potentiometer 15 is set to a position which barely causes starting. Input 1 of adder 14 thus allows the motor to be supplied with the current corresponding to its break-away starting torque.

Potentiometer 16 is then set to a position giving the motor its maximum speed of rotation. Input 2 of adder 14 thus furnishes to the motor the current corresponding to losses as a function of the speed.

Potentiometer 17 is then set in the position for which the motor accelerates from a zero speed to its maximum speed in a chosen time. Input 3 of adder 14 thus furnishes to the motor the current corresponding to its speed increase or acceleration.

Potentiometer 19 is then adjusted so that the useful current in the motor corresponds to the chosen fraction of the total current, and potentiometers 22, 23 and 24 are adjusted so as to balance the different inputs of amplifier 20.

Consequently it will be noted that, when switch 25 is closed, amplifier 20 furnishes to the motor exactly the current needed to rotate at the speed corresponding to the speed set by resistor 27. The motor will turn at this speed no matter what load is applied to it. In the case of an application of the motor to a physical exercise apparatus, this corresponds to isokinetic operation.

In the case in which switch 29 is closed, the motor will supply exactly the torque set and displayed at 30, regardless of its speed of rotation. In the case of an application of the motor to measure force, the torque exerted on the motor shaft will be displayed. In the case of an application to a physical exercise apparatus, this corresponds to isotonic operation.

Finally, when switch 31 is closed, the motor can be caused to follow any desired mode of operation. In the case of an application to a physical exercise apparatus, it is possible in particular to apply an oscillating force while keeping the position of the working mechanism fixed, which corresponds to an isometric operation.

Figure 3:
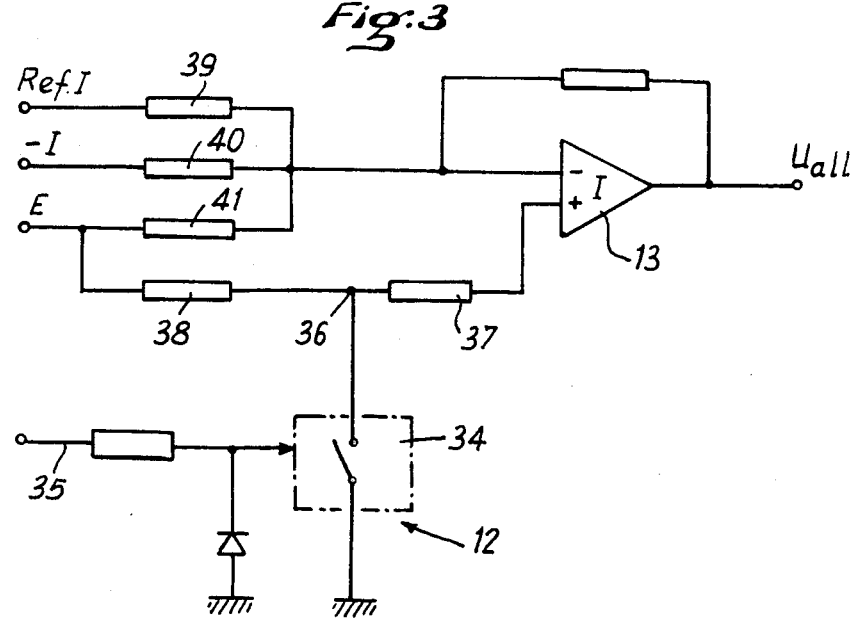
FIG. 3 also shows the linearization unit of FIG. 1 in greater detail.

Linearization circuit 12 shown on FIG. 3 includes a switch 34 controlled from input 35 which receives signals from one output of logic control unit 5.

Switch 34 is connected between ground and the common junction 36 of two resistors 37 and 38. The other terminal of resistor 37 is connected to the positive input of amplifier 13, and the other terminal of resistor 38 receives the feed back speed signal, that is, the voltage at the terminals of tachometer generator 2.

The negative input of amplifier 13 receives on the one hand, the current reference signal by means of a resistor 39, on the other hand, the feed back current signal by means of a resistor 40, and finally the feed back speed by means of a resistor 41.

Consequently it will be noted that, when switch 34 is closed, amplifier 13 receives feed back speed signal E on its negative input. E is consequently added to the current difference signal. To the contrary, resistors 37, 38 and 41 are so chosen that, if switch 34 is open the feed back speed signal E is applied to the positive input of amplifier 13, in which case E is subtracted from the current difference signal.

Figure 4A:
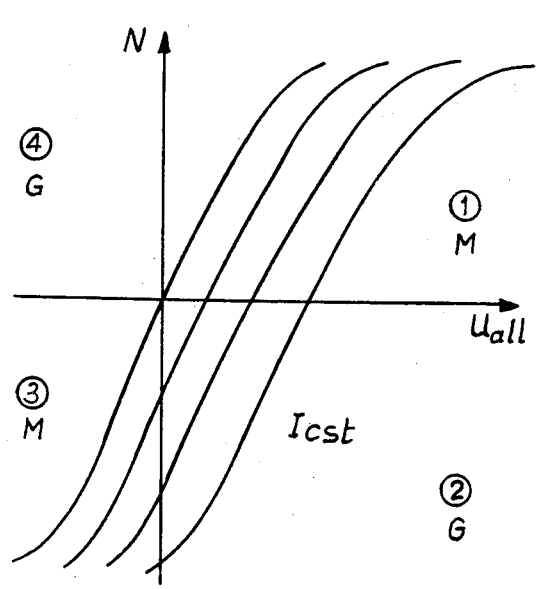
FIG. 4A shows characteristic curves of a direct current motor with a conventional control.
Figure 4B:
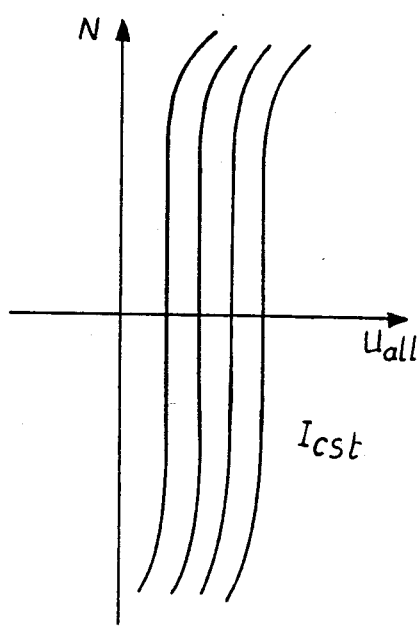
FIG. 4B shows characteristic curves of a direct current motor with a control according to the invention.

FIGS. 4A, 4B show the characteristic curves of the motor in the voltage plane for excitation/speed for a constant current in the motor. This latter operates as a motor, per se, in quadrants 1 and 3 and as a generator in quadrants 2 and 4.

The torque being proportional to the current, it will be seen on FIG. 4A that, in the case of a classical control, this torque depends both on the voltage at the input of the exciter and on the speed. On the contrary, it will be seen on FIG. 4B that the linearization according to the invention has straightened or made upright the curves of constant current (and thus of torque), so that a single torque corresponds to a given voltage at the input of the exciter, regardless of the speed of rotation of the motor.

Numerous variations and modifications can of course be made from the preceding description without exceeding either the scope or the spirit of the invention.

Thus in particular it is possible to detect the direction of rotation of the motor at the terminals of the tachometer generator and, as a function of this direction, to provide different values to the current limiter for the break-away input and for the set or displayed force.

I claim:

1. A control device for a direct current machine powered by a set of rectifier bridges comprising:
    an external speed control loop including means for generating a speed signal representative of the actual speed of rotation of the machine, first comparing means for comparing said speed signal to a reference signal and generating a speed error signal, and first amplifying means for amplifying said speed error signal and generating a current reference signal;
    an internal current control loop including second comparing means for comparing the actual current in the machine to said current reference signal and generating a current error signal, and second amplifying means for amplifying said current error signal and generating a control signal;
    a control circuit for controlling said set of rectifier bridges, said control circuit being responsive to said control signal; and
    a current limiter connected between the output of said first amplifying means and the input of said internal current control loop, said current limiter including means for generating a first signal corresponding to the current required to compensate for the losses of the machine, means for providing a second signal corresponding to the useful current, and adding means for adding said first and second signals.

2. The control device of claim 1, wherein said means for generating said first signal includes means for separately generating a signal corresponding to the break-away torque and a signal corresponding to losses as a function of speed.

3. The control device of claim 1, wherein said current limiter further includes means for generating a third signal corresponding to the current required by the motor to overcome the forces of inertia and to reach the desired rotation speed, and for adding said third signal to said first and second signals.

4. The control device of claim 3, having inputs of said adding means comprising center taps of potentiometers connected between ground and respectively, a fixed voltage, a voltage representative of the speed of rotation of the machine, a voltage representative of the acceleration of the machine, and a voltage representative of the useful current.

5. The control device of claim 1 wherein said means for providing said second signal include at least one of first circuit means for providing a signal representative of the difference between the speed of rotation of the machine and a reference speed, second circuit means for providing a signal representative of a reference torque, and third circuit means for providing a signal representative of a given function of time.

6. The control device of claim 5, wherein said means for providing said second signal include at least two of said first, second and third circuit means, and switch means for selecting one of said circuit means.

7. The control device of claim 1 including display means connected to said means for providing said second signal.

8. A control device for a direct current machine powered by a set of rectifier bridges comprising:
    an external speed control loop including means for generating a speed signal representative of the actual speed of rotation of the machine, first comparing means for comparing said speed signal to a reference signal and generating a speed error signal, and first amplifying means for amplifying said speed error signal and generating a current reference signal;
    an internal current control loop including second comparing means for comparing the actual current in the machine to said current reference signal and generating a current error signal, and second amplifying means for amplifying said current error signal and generating a control signal;
    means for generating a linearization signal the absolute value of which is a function of the speed of rotation of the machine and the sign of which depends on whether the machine is operating as a motor or as a generator; and
    adding means for adding said linearization signal to said current error signal.

9. The control device of claim 8 wherein said means for generating a speed signal being operative to generate a signal the absolute value of which is proportional to the speed.

10. The control device of claim 8 for controlling a machine powered by two rectifier bridges, and including a logic control unit to select one of the bridges depending on whether the machine is operating as a motor or as a generator, wherein said logic control unit comprises means for controlling the sign of said linearization signal.

11. The control device of claim 10, including a switch controlled by said logic control unit, said switch being arranged to feed said absolute value of the linearization signal alternatively to a positive input or to a negative input of said second amplifying means.

* * * * *